(12) United States Patent
Finsterwalder

(10) Patent No.: US 8,768,506 B2
(45) Date of Patent: Jul. 1, 2014

(54) NETWORKED INDUSTRIAL CONTROL AND METHOD FOR CHANGING OF AN OPERATING MODE OF SUCH AN INDUSTRIAL CONTROL

(75) Inventor: Thomas Finsterwalder, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 346 days.

(21) Appl. No.: 12/645,531

(22) Filed: Dec. 23, 2009

(65) Prior Publication Data

US 2010/0161121 A1 Jun. 24, 2010

(30) Foreign Application Priority Data

Dec. 23, 2008 (DE) .................... 10 2008 062 934

(51) Int. Cl.
*G06F 19/00* (2011.01)
(52) U.S. Cl.
USPC .......................................... 700/245
(58) Field of Classification Search
USPC .......................................... 700/245
See application file for complete search history.

(56) References Cited

U.S. PATENT DOCUMENTS

| | | | |
|---|---|---|---|
| 6,047,378 A | 4/2000 | Garrett et al. | |
| 6,311,276 B1 | 10/2001 | Connery et al. | |
| 6,901,298 B1 | 5/2005 | Govindaraj et al. | |
| 7,142,943 B2 * | 11/2006 | Groll et al. | 700/169 |
| 7,159,007 B2 * | 1/2007 | Stawikowski | 709/202 |
| 2003/0023333 A1 * | 1/2003 | Birkle | 700/96 |
| 2004/0128027 A1 | 7/2004 | Groll et al. | |
| 2008/0086553 A1 | 4/2008 | Theobald | |
| 2009/0088896 A1 * | 4/2009 | Tobey | 700/245 |
| 2009/0287812 A1 | 11/2009 | Weber et al. | |

FOREIGN PATENT DOCUMENTS

| | | |
|---|---|---|
| DE | 10049344 A1 | 4/2001 |
| DE | 20004370 | 7/2001 |
| DE | 10304706 | 2/2004 |
| DE | 202005001650 | 5/2005 |
| DE | 102005027387 | 12/2006 |

(Continued)

OTHER PUBLICATIONS

Second Office Action for Chinese Appl. No. 200910249513.5 dated Jun. 4, 2013 (11 pages).

(Continued)

*Primary Examiner* — Behrang Badii
*Assistant Examiner* — Daniel L Greene
(74) *Attorney, Agent, or Firm* — Choate, Hall & Stewart LLP; Andrea L. C. Robidoux

(57) ABSTRACT

A method according to the present invention for changing of an operating mode of at least one industrial control (1-1) of a plurality of networked industrial controls (1-1, 1-2), in particular of a robot control, comprises the steps of:

sending a first packet (I-1) via a network (3) of the networked industrial controls (1-1, 1-2);
receiving said first packet (I-1) by a receiving means (1-1.1) of at least one industrial control; and
changing of said industrial control from a first operating mode (A) into a second operating mode (H) on basis of said received first packet (I-1) if the first packet (I-1) is addressed to said industrial control, wherein in the first opening mode (I) and in the second operating mode (II) different groups of components (1.1-1, 1-1.3, 1-1.4, 1-1.5, 1-1.6) of the industrial control (1-1) are supplied with energy.

17 Claims, 1 Drawing Sheet

(56) References Cited

FOREIGN PATENT DOCUMENTS

| EP | 0777172 | B1 | 4/2004 |
| EP | 1545052 | A1 | 6/2005 |
| WO | WO-2007104152 | A2 | 9/2007 |
| WO | WO-2008151317 | A1 | 12/2008 |

OTHER PUBLICATIONS

Extended European Search Report for 09013799.2-1807, dated Feb. 21, 2013 (9 pages).

First Chinese Office Action for 200910249513.5 dated Sep. 24, 2012 (12 pages).

* cited by examiner

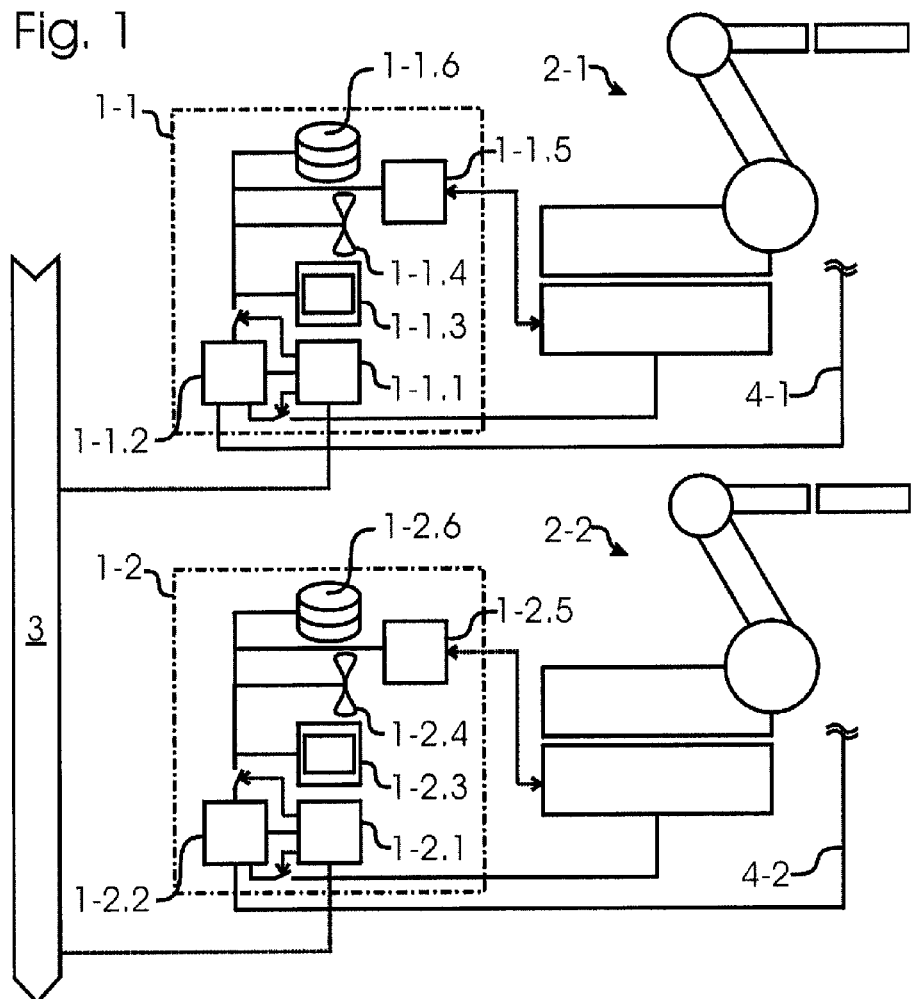
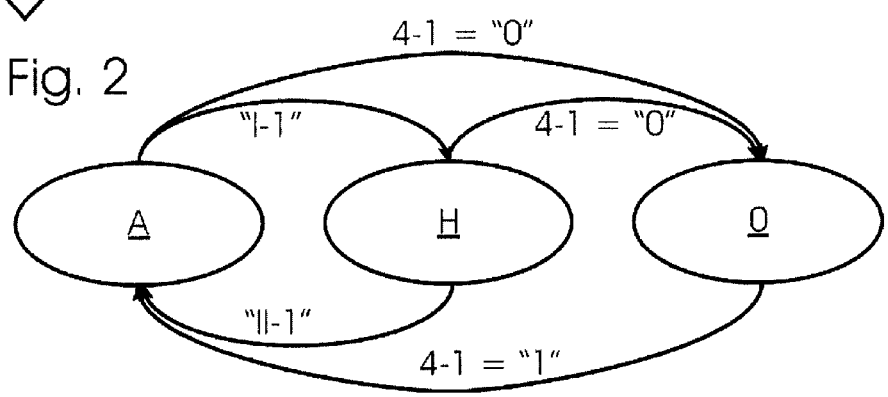

NETWORKED INDUSTRIAL CONTROL AND METHOD FOR CHANGING OF AN OPERATING MODE OF SUCH AN INDUSTRIAL CONTROL

The present invention relates to a method for changing of an operating mode of networked or linked industrial controls, in particular robot controls, as well as to an industrial control, in particular a robot control, which is adapted for the execution of such a method.

Today's industrial robots frequently work in groups, for example in a production line or the like. Therein each robot has its own robot control which can communicate for example over Ethernet with other ones. In particular such robot controls, but also controls of other automated industrial installations, for example controls of a welding process, a clamping process or a bonding process, which are named generally industrial controls in the following, are increasingly realized PC-based according to in-house practice, i.e. using industrial PCs, as for example DE 200 04 370 U1 or DE 103 04 706 A1 of the present applicant teach.

In order to shut down such an industrial control, i.e to transfer it into an inactive operating mode, so far a main switch of the control is operated with which the industrial control is separated completely from an external power supply. The industrial control is connected with the external power supply again and thus transferred into an active operating mode by operating the main switch again.

Therein the industrial control can execute a complete system start or restart upon connection with the power supply in which individual components are newly calibrated or initialized. Alternatively the industrial control can also first store current data in a so-called "freeze file" when separation from the external power supply occurs. If the industrial control then is again connected with the external power supply, these stored data are accessed so that no complete system or restart needs to be accomplished. This shortens the time for the restarting operation of an industrial control or of a robot controlled by it respectively.

Since so far the deactivation is always introduced by operating the main switch, i.e with complete separation from the external power supply, the following shut-down and in particular storing of the data is performed by means of accumulators of the industrial control. Thus each shut-down of an industrial control disadvantageously stresses or discharges their energy storages and therefore can shorten their life span. Besides a damaged or not sufficiently charged energy storage impairs controlled shut-down and in particular the storing of current data in such a freeze file.

It is an object of the present invention to improve changing of an operating mode of at least one of several networked industrial controls controlling automated industrial installations, in particular robots.

This object is solved by a method with the features of claim 1 and an industrial control with the features of claim 13 respectively. Claims 14, 15 protect an appropriate computer programme and computer programme product respectively, in particular a storage medium or a data carrier, while depending claims relate to advantageous embodiments.

According to the present invention firstly a first data packet is sent via a network of the networked industrial controls to change the operating mode of one or more industrial controls linked with one another, in particular one or more robot controls.

In particular, if one or more of these controls are PC-based, the network preferably is Ethernet-based and preferentially is based on PROFINET, the Ethernet IP of Rockwell or another industrial Ethernet standard for automation. A suitable Ethernet protocol for example is standardized in IEEE norm 802.3.

If a receiving means of an industrial control, for example a network controller or a network card or board, receives such a first packet, the industrial control changes from a first into a second operating mode if the first packet is addressed to this industrial control.

The first packet can for example be a so-called "Magic Packet". The packet may for example comprise a locally or globally unique key assigned to this industrial control, i.e. a so-called MAC key, for example by repeating, preferably continuously, for a given number this MAC key after an introductory marking as a first packet. A group of industrial controls can be addressed for example by using a key which is assigned to the desired group instead of a key which is assigned to only one industrial control, wherein the receiving means of each industrial control of this group recognizes due to the group affiliation that (also) the own industrial control is addressed. Equally the first packet for example can comprise a key which is common to all MAC keys of the group, for example a corresponding or identical part of the MAC keys, or all industrial controls of the group can be addressed separately in parallel or successively.

In the first and the second operating mode, different groups of components of the industrial control are supplied with energy, preferably by being connected with an external power supply or separated therefrom respectively.

In particular one of the first and second operating mode can be an energy saving mode of the industrial control in which the receiving means is, preferably essentially exclusively, further supplied with energy for receiving packets while a group of other components of the industrial control, preferably the majority of its components, is not further supplied with energy, while the other one of first and the second operating mode can be an active or normal operation mode in which both the receiving means as well as said group of other components of the industrial control are supplied with energy. Such other components can be for example be devices, drives, fans, circuit boards, input and/or output means such as monitors, displays, keyboards, control handhelds, CPUs and the like. The energy consumption advantageously can be lowered by changing into such an energy saving mode.

An industrial control in the meaning of the present invention can also comprise one or more actuators, in particular electric motors, for example the driving motors of one or more manipulators. Thus it is also possible that in another energy saving mode essentially only one or more, in particular all actuators of the industrial control are separated from a power supply while the remaining components of the industrial control, for example devices, drives, fans, circuit boards, computing and memory units, input and/or output means and in particular the receiving means are supplied with energy. Thereby a safety control can remain active also in this other energy saving mode.

According to a preferred further embodiment it can be changed or switched between more than two operating modes selectively, in particular between a normal operation mode, an energy saving mode in which essentially exclusively the receiving means is supplied with energy, and an other energy saving mode in which essentially only actuators are separate from a power supply. It can be changed selectively by sending a first packet for example from the normal operation mode or the other energy saving mode into the energy saving mode or by sending another first packet for example from the normal operation mode or the energy saving mode, into the other energy saving mode.

Additionally in one or more energy saving modes, closing of one or more brakes of the automated industrial installation controlled by the industrial control, for example activating brakes of a robot, and/or non-supplying energy to one or more consumer loads of this industrial installation, for example actuators of a robot, for example by separating the consumer loads from an external power supply in order to further reduce the energy consumption in this mode can be provided.

Thus in a preferred embodiment by sending a first packet, in particular a Magic Packet, one or more linked robot or other industrial controls can be transferred from an active mode into an energy saving mode in which only a part of the components, in particular a receiving means to receive further packets, is supplied with energy.

Advantageously one or more components of the control may remain further connected with an external power supply for at least a certain time period. This in particular makes it possible—contrary to the known complete separation by operation of a main switch and associated storing of a freeze file with stressing an energy storage of the control—to shut down the control which further remains connected with the external power supply, and in particular to store current data by means of energy from the external power supply, which preserves energy storages of the control such as accumulators and thus can extend their life span. When changing from energy saving into an active operating mode then these stored data can be accessed to shorten the time for the restarting operation.

The energy saving mode can in particular be a so-called Hybernate operating mode in which a receiving means of the industrial control remains connected with an external power supply for receiving packets and in which current data are stored in a freeze file or initialization data record respectively which is accessed when restarting the industrial control.

In a preferred embodiment by sending a second packet, in particular a Magic Packet, one or more linked robot or other industrial controls can be transferred from an energy saving mode into an active operating mode in which in particular also control components can be supplied with energy which are not supplied continuously with energy in the energy saving mode.

If it is provided in an energy saving mode to close one or more brakes of the automated industrial installation controlled by the industrial control and/or to separate one or more consumer loads of this industrial installation from a power supply, then preferentially the brakes are opened and the consumers are again supplied with energy respectively on basis of the second packet.

The second packet can be identical to the first packet or differ therefrom. In particular the first and/or second packet can be a Wake on LAN packet as it is known for example from DE 20 2005 001 650 U1, DE 10 2005 027 387 A1 or EP 0 777 172 B1.

The transfer from a first into a second operating mode, for example into an energy saving mode or into an active or normal operation mode, advantageously allows the selective shut-down and/or restart of individual industrial controls or groups of industrial controls, in particular robot controls. Contrary to present practice advantageously it is not longer necessary to manually operate the main switches of the respective controls. This increases significantly the flexibility of the linked industrial controls and the automated processes and industrial installations controlled by them respectively. For example a part of an automated manufacturing, for example one of several production lines or production branches, can be shut down and/or activated over the network for adjusting to changing capacities or for maintenance purposes. In a preferred embodiment if a whole set of controls is successively activated and/or deactivated, thereby peaks in the restart and/or shut-down voltage can be smoothed.

A first and/or second packet can be addressed, as described in the foregoing, directly to an industrial control or a group of industrial controls, for example by comprising an appropriate key as a Magic Packet. In particular in order to shut down or restart a complete group of industrial plants, for example a factory floor with linked industrial robots, a first and/or second packet can also be addressed as Broadcast to all networked industrial controls.

A packet can for example be sent by a group control, in particular a line PLC ("Programmable Logic Controller") of the industrial controls linked with one another. Additionally or alternatively it is also possible to send it from an industrial control of the networked industrial controls, for example if single or all industrial controls comprise appropriate software modules.

In a preferred embodiment an industrial control can change from the first into the second operating mode not only upon receiving a first packet over the network but additionally also on basis of an input to an input means of the industrial control. To this purpose for example a remote means or a so-called control handheld like it is used for instance to teach robots can comprise appropriate input means, for example a switch or a control instruction. If the operator operates this input means, for example by operating the switch or by inputting an appropriate control instruction, the industrial control likewise changes into the second operating mode, for example into an energy saving mode. Thereby the flexibility and the redundancy are advantageously further increased and in particular also an input directly on-site becomes possible.

An industrial control accordingly can also change from an energy saving mode into an active mode on basis of an input to the input means. An industrial control can change into a first operating mode, for example an active mode, in a preferred embodiment additionally or alternatively by connecting the receiving means with an external power supply. For example if it was changed into the energy saving mode by receiving the packet or input via the input means and preferably current data were stored into a freeze file while at least the receiving means remains connected with an external power supply, then thereafter by switching a main switch off as with the well-known methods an operating mode can be reached which is completely separate from the power supply. Independently of whether this was caused as conventionally by directly operating of the main switch, i.e with storing freeze files under stressing of control-own energy stores, or after change into the energy saving mode according to the present invention with storing freeze files by means of energy from an external power supply, it then can be changed into the active operating mode by switching the main switch on again.

Further advantages and features yield from the depending claims and the embodiments. To this purpose, partly schematized:

FIG. 1: shows two networked robot controls according to an embodiment of the present invention; and FIG. 2: shows a state diagram of a method according to an embodiment of the present invention.

FIG. 1 shows two industrial robots 2-1, 2-2, whose PC-based robot controls 1-1 and 1-2 respectively are linked with one another over a Ethernet 3. A production line can comprise further robots or other automated industrial installations, for example clamping means, welding means or bonding means (not shown), whose industrial controls are likewise linked over the Ethernet 3.

The two robot controls 1-1, 1-2 each comprise receiving means in form of a network controller 1-$i$.1 ($i$=1, 2) for receiving packets over the Ethernet 3, as well as a power pack 1-$i$.2, which is connected with an external power supply 4-$i$ and which supplies energy to the network controller 1-$i$.1 as well as to further components of the respective control 1-$i$, in particular input/output means 1-$i$.3, a fan 1-$i$.4, a control CPU 1-$i$.5 for the robot 2-$i$, as well as a device or drive 1-$i$.6. As symbolized in FIG. 1 by a dotted arrow, the network controller 1-$i$.1 can interrupt the power supply between power pack 1-$i$.2 and further control components 1-$i$.$j$ ($j$=3, 4, . . . 6).

In FIG. 2 the flow or execution of a method according to the present invention is shown in form of a so-called state diagram (Petri net or finite state machine), in which ellipses symbolize operating modes and arrows symbolize changes between these operating modes, wherein the event which causes a change is noted at the arrow.

In the following a method according to the present invention is described on the basis of robot control 1-1. Additionally or alternatively also robot control 1-2 and/or further controls not shown may work in a similar way.

First be robot control 1-1 is in a first, active or normal operation mode "A" (left in FIG. 2), in which all components 1-1.1, 1-1.3 to 1-1.6 as well as actuators of the robot 2-1 (not shown) are supplied with energy via the power pack 1-1.2 by the external power supply 4-1. In a modification not shown it is also possible to supply the actuators of the robot 2-1 with energy via a separate power pack.

Now if for example the robot 2-1 and its control 1-1 are to be shut down, for example for maintenance purposes or to reduce the manufacturing capacity, according to present practice the control 1-1 can be separated completely from the power supply 4-1 by switching a main switch off (not shown). Due to this event indicated as "4-1=, 0" the control changes in a third operating mode "O" (right in FIG. 2) which is completely separate from the power supply 4-1.

Disadvantageously the main switch must be operated manually thereto, which in particular with a plurality of robots to be shut down, for example in (partly) automated manufacturing, is laborious.

In order to avoid a complete new calibration and initialization at restart, it is provided that when leaving the normal operation mode "A", current data, for example calibration and initialization data, are stored into a freeze file which is accessed when resuming operation. With the conventional separation of the external power supply 4-1 by manually operating the main switch ("4-1='0 '") this disadvantageously must take place under stressing or discharging internal accumulators of the control (not shown).

Therefore according to invention additionally to the way described above there now is provided to send a first packet in form of a Magic Packet I-1 via the Ethernet 3. This comprises for example six times in sequence the hexadecimal value "FF", directly followed of a continuous six-ten times repetition of the 48-bit MAC address of robot control 1-1.

The network controller 1-1.1 recognizes the Magic due to this addressing and transfers the control 1-1 into a second operating mode, an energy saving or Hybernate operating mode "H" (center in FIG. 2), in which the network controller 1-1.1 interrupts the power supply of input/output means 1-1.3, of the fan 1-1.4, of the CPU 1-1.5 for the robot 2-1 as well as of the drive 1-1.6 by the power pack 1-1.2 after the current data have been stored in the freeze file, brakes of the robot 2-1 have been closed and driving motors of the robot 2-1 have been separated from the external current supply 4-1, as symbolized likewise by a dotted arrow in FIG. 1. In this Hybernate operating mode "H" thus hardly any energy is consumed, in particular compared to the third operating mode "O" only the energy of the network controller 1-1.1 which remains active in order to receive further packets.

Advantageously robot control 1-1 as such remains further connected with the external power supply 4-1 at the change from the active operating mode "A" so that the accumulators of the control 1-1 are not stressed or loaded when changing as it is the case with the above-described present practice. Besides it is possible to stop or shut down robot control 1-1 selectively over the Ethernet 3 and thus for example by means of a line PLC (not shown) without operating manually a main switch as it is the case with the above-described present practice.

By sending via Ethernet 3 a further Magic Packet II-1, which is identical to the first packet described above, the robot control 1-1 is transferred back again into the active operating mode "A". To this purpose the network controller 1-1.1 to which energy is supplied also in the Hybernate operating mode "H" by the power pack 1-1.2 recognizes Magic Packet II-1 addressed to the control 1-1 and causes the supply of input/output means 1-1.3, the fan 1-1.4, the control CPU 1-1.5 for the robot 2-1 as well as the drive 1-1.6 by the power pack 1-1.2, the initialization on basis of the data stored in the freeze file, the supply of the driving motors of the robot 2-1 by the external current supply 4-1 as well as the opening of its brakes.

If in a modification not shown additionally there are sent via the Ethernet 3 Magic Packets addressed to the control 1-2 or Magic Packets which are recognized by both of the network controllers 1-1.1 and 1-2.1 as addressed to the own control respectively, additionally the control 1-2 can be transferred into an Hybernate operating mode and/or into the active operating mode again. Accordingly a selective shutdown and/or start-up of different industrial controls or groups of industrial controls is possible. Equally, by sending a Broadcast Magic Packet all industrial controls linked via the Ethernet 3 with one another can be stopped or started in parallel or successively.

In FIG. 2 an additional option is shown to transfer robot control 1-1 manually back again into the active operating mode. After control 1-1 has been transferred into the Hybernate operating mode "H" as described above on the basis of a Magic Packet I-1, or in an embodiment not shown by means of inputting of an appropriate instruction to a control handheld of control 1-1 as it is used for example for teaching of the robot 2-1, the main switch of the control 1-1 is switched off short-time and the control 1-1 is completely separated from the external power supply 4-1 ("4-1='0'"). If the main switch is switched on again thereafter ("4-1='1'"), the control 1-1 returns to the active operating mode "A" irrespective of how it arrived at the third operating mode "O" completely separated from the external power supply. When changing to this operating mode it is first checked whether a valid freeze file is present. If this is the case, the robot 2-1 and its robot control 1-1 are activated, in particular initialized, on basis of data stored in the freeze file in a so-called warm start. If no valid freeze file is present at a change into the active operating mode "A" then a so-called cold starting takes place in which the control 1-1 is booted completely and control 1-1 and robot 2-1 are calibrated and initialized completely.

In a modification not shown separately also the actuators of the robots 2-1, 2-2 are part of the industrial control 1-1 and 1-2 respectively. If in said modification another first packet is sent in the Ethernet 3 in form of a Magic Packet which contains for example six times in sequence the hexadecimal value "EE", directly followed of a continuous six-ten times repetition of the 48-bit MAC address of robot control 1-1, the network controller 1-1.1 recognizes the Magic packet due to this addressing and transfers the control 1-1 into another energy saving operating mode in which the network controller 1-1.1 interrupts only the power supply of the actuators of the robot 2-1 after brakes of the robot 2-1 have been closed as indicated by the dotted arrow in FIG. 1. In this other energy saving operating mode likewise less energy is consumed while at the same time network controllers 1-1.1, input/output means 1-1.3, fan 1-1.4, control CPU 1-1.5 for the robot 2-1 as well as drive 1-1.6 remain connected to the external current supply 4-1 by the power pack 1-1.2 and thus are able to maintain a safety control.

In all other respects said modification may correspond to the embodiment described before, wherein only energy saving or Hybernate operating mode "H", in which the power supply of input/output means 1-1.3, of fan 1-1.4, of control CPU 1-1.5 for the robot 2-1 as well as of drive 1-1.6 is interrupted by the power pack 1-1,2, is to be imagined replaced by the other energy saving operating mode in which the network controller 1-1.1 only interrupts the power supply of the actuators of the robot 2-1. In a further, likewise not separately shown modification, the two embodiments described above may be combined, so that by sending of the Magic Packet I-1 it is changed into the Hybernate operating mode while by sending of the other first packet in form of a Magic Packet which contains the hexadecimal value "EE" it is changed into the other energy saving operating mode with separated drives.

REFERENCE SYMBOL LIST

1-1, 1-2 Robot control
1-1.1, 1-2.1 Network controller
1-1.2, 1-2.2 Power pack
1-1.3, 1-2.3 Input/output means
1-1.4, 1-2.4 Fan
1-1.5, 1-2.5 Robot control CPU
1-1.6, 1-2.6 Drive
2-1, 2-2 Robot
3 Ethernet
4-1, 4-2 external energy supply network
I-1, II-1 Magic Packet
A Active operating mode
H Hybernate operating mode
0 Operating mode completely separate from external power supply

I claim:

1. A method for changing of an operating mode of at least one robot control of a plurality of networked robot controls each controlling a respective robot, comprising the steps of:
sending a first packet via a network of the networked robot controls; and
receiving said first packet by a receiving means of at least one robot control;
wherein the first packet sent over the network and received by the receiving means causes said robot control to change from an active operating mode into a hibernate mode, or from the hibernate mode into the active operating mode, on basis of said received first packet if the first packet is addressed to said robot control,
wherein in the active operating mode a group of components of the robot control are supplied with energy such that the robot is functional to perform robotic operations,
wherein for the duration of the hibernate mode, at least one brake of the robot controlled by the robot control is closed, and the group of robotic components of the robot control are not supplied with energy such that the robot is not functional to perform the robotic operations, and
wherein the first packet is sent via a control system configured to selectively change the respective robot controls of the plurality of networked robot controls between respective active operating modes and respective hibernate modes.

2. A method according to claim 1, wherein at least one of the plurality of robot controls linked with one another is PC-based.

3. A method according to claim 1, wherein a robot control changes from the hibernate mode into the active operating mode, or from the active operating mode into the hibernate mode, when receiving a second packet if the second packet is addressed to this robot control.

4. A method according to claim 1, wherein a packet is addressed directly to a robot control or is addressed to a group of robot controls or addressed as a Broadcast to all networked robot controls.

5. A method according to claim 1, wherein a packet is sent by one of a group control, in particular a line PLC, and a robot control of the networked robot controls.

6. A method according to claim 1, wherein the network is Ethernet-based, in particular based on PROFINET or on another industrial Ethernet standard for automation.

7. A method according to claim 1, wherein a robot control changes from the active operating mode into the hibernate mode, or from the hibernate mode into the active operation mode on basis of an input to an input means of the robot control.

8. A method according to claim 1, wherein a robot control changes into the active operating mode or the hibernate mode when connecting the receiving means to an external power supply.

9. A robot control of an automated robot installation configured to perform the method according to claim 1, the robot control comprising:
a receiver configured to receive packets via a network of robot controls linked with one another, wherein the robot control is configured to adopt a first and a second operating mode, wherein in the first operating mode and in the second operating mode different groups of components of the robot control are supplied with energy.

10. A computer program product with program code, which is stored on a non-transitory machine-readable carrier and comprises a computer program, wherein execution of the program code by the machine causes the machine to perform the method according to claim 1.

11. The method of claim 1, wherein, in the hibernation mode, at least one actuator of the robot is not supplied with energy.

12. A method according to claim 1, wherein the hibernate mode is an energy saving mode of the robot control in which the receiving means is supplied with energy.

13. A method according to claim 12, wherein the robot control stores current data when changing into the energy saving mode and accesses these stored data when changing from the energy saving mode.

14. A method according to claim 1, wherein a packet sent via the network is at least one of a packet for activating an energy saving mode and a packet for deactivating an energy saving mode, in particular a Wake on LAN packet.

15. A method according to claim 14, wherein in the energy saving mode at least one consumer of the robot is not supplied with energy.

16. The method according to claim 1, wherein:
the sending the first packet over the network of the networked robot controls is performed by one of the networked robot controls.

17. The method of claim 16, wherein each of the networked robot controls is configured to send a respective first packet.

* * * * *